July 9, 1929.  H. D. BARNETT  1,720,258
AUTOMOBILE LICENSE PLATE ATTACHMENT

Filed May 31, 1927

INVENTOR
*Hugh Dean Barnett,*
BY
ATTORNEY

Patented July 9, 1929.

1,720,258

UNITED STATES PATENT OFFICE.

HUGH DEAN BARNETT, OF LONG BEACH, CALIFORNIA.

AUTOMOBILE LICENSE-PLATE ATTACHMENT.

Application filed May 31, 1927. Serial No. 195,461.

My invention relates to license plates for motor vehicles, and it has for a purpose the provision of an attachment therefor by which issuance of new plates annually as is now the practise and the expense attendant thereto are eliminated.

My invention embodies the provision of a simple and inexpensive attachment which is applicable to the present license plate for visibly indicating the current year of use of the plate, the attachment being removable from the plate at the expiration of the current year to be substituted by a similar attachment bearing the number of the new year. In this manner the attachments are changed each year and may be issued by a State license bureau for a license fee in the same manner as the present license plates but without the annual removal and discarding of plates as is now the practise. It is not difficult to realize the tremendous expense involved in the annual issuance of license plates, and that by the provision of my attachment, such expense is rendered needless.

I will describe only one form of license plate and attachment thereof embodying my invention, and will then point out the novel features in the claim.

In the accompanying drawings, Fig. 1 is a view showing in rear elevation an automobile having applied thereto one form of license plate and detachment embodying my invention.

Fig. 2 is an enlarged vertical sectional view taken on the line 2—2 of Fig. 1.

Fig. 3 is a transverse sectional view taken on the line 3—3 of Fig. 2.

Fig. 4 is a detail perspective view of the attachment shown in the preceding views.

Figure 1:
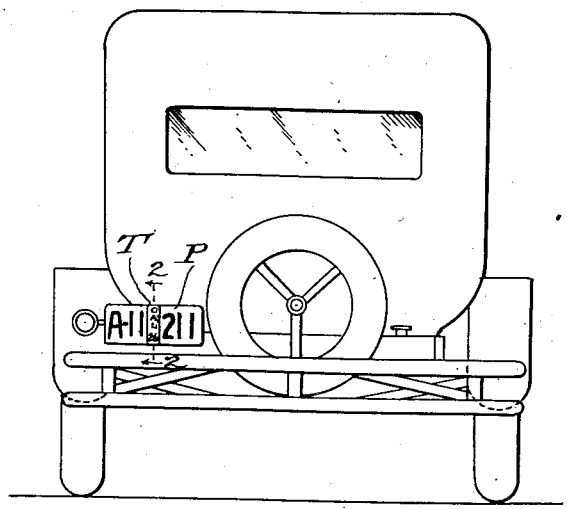
Figure 1:
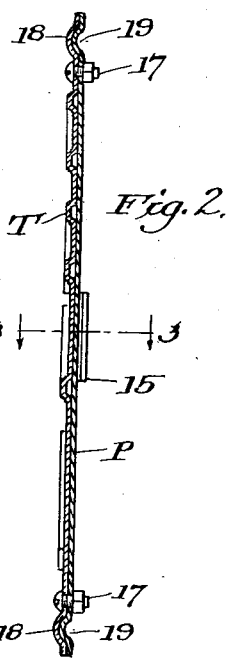
Figure 1:
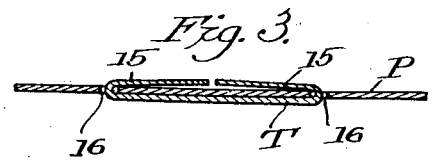
Figure 1:
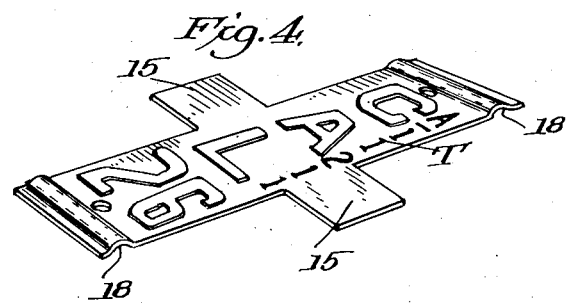

Referring specifically to the drawings, my invention in its present embodiment comprises a conventional form of license plate P, constructed of sheet metal or other suitable material, and on the face of which are embossed and enameled digits representing the number of the license and a letter identifying the series of the number, all clearly shown in Fig. 1. In license plates of this character, certain of the digits of the number are spaced apart sufficiently to accommodate an abbreviation of the name of the State by which the license is issued, and the year of the license. This indicia is embossed and painted in the same manner as the license number, and because of the fact that it discloses the particular year for which the license plate was issued, at the expiration of the year the plate becomes useless, and in accordance with the present practise it is necessary to make and issue new license plates.

My invention embodies the provision of an attachment for the present license plate by which it can be used from year to year by the annual substitution of a new attachment bearing the date of the current year. The attachment in the present instance comprises an elongated plate, preferably corresponding in length with the width of the license plate P, and as shown in Figs. 1 and 4 bearing an abbreviation of the State by which the license plate was issued, numerals representing the current year and numerals representing the license number of the plate to which it is attached. The plate is indicated at T, and may be constructed of sheet metal with the identifying indicia embossed and painted in the same manner as the indicia on the license plate. The plate is of such width as to be interposed between the spaced plate digits without covering the latter as illustrated in Fig. 1. Medially of its ends the plate is formed with tongues 15 bendable so as to be extendable through slots 16 in the license plate P and to the rear side of the plate for securing the medial portion of the plate T to the license plate. As shown in Fig. 2, the plates P and T are provided with suitable openings through which bolts 17 are extended to provide further means for detachably securing the plates to each other. The opposite ends of the plate T may be bent as indicated at 18 to accommodate the conventional bead 19 on the face of the license plate, in order that the attachment when applied will lie contiguous to the license plate.

With the attachment applied, it will be manifest that by virtue of the indicia thereon, the State by which a license is issued and the year thereof will be clearly indicated on the face of the license plate. At the expiration of the ensuing year as indicated by the year number on the attachment, it can be readily removed and a new one substituted bearing the license number and the number of the new year, and the abbreviation of the State. In this manner the attachment plates can be issued annually in place of the entire license plate, the latter being retained by the owner from year to year, thus eliminating the tremendous expense attendant the annual issuance of license plates as is now the present practice.

Although I have herein shown and described only one form of automobile license plate attachment embodying my invention, it is to be understood that various changes and modifications may be made herein without departing from the spirit of the invention and the spirit and scope of the appended claim.

I claim as my invention:

An article of manufacture comprising a relatively narrow plate of elongated rectangular shape, bearing indicia identifying the State, the license number, and the current year of use of a license plate, to which said plate is adapted to be attached, bendable tongues projecting from the side edges of the plate substantially medially between its ends and adapted to be extended through slots in the license plate to detachably secure said plate to the license plate, the plate having openings adjacent its ends, bolts extendible through said openings and adapted to be extended through openings in the license plates, and nuts for the bolts adapted to co-operate with the latter in providing an additional securing means for said plate, the plate being provided with grooves extending transversely adjacent its ends, in which conventional beads on the license plate are adapted to be received to aid in positively positioning said plate on the license plate.

HUGH DEAN BARNETT.